United States Patent [19]

Ho et al.

[11] Patent Number: 4,683,114

[45] Date of Patent: Jul. 28, 1987

[54] BURNABLE ABSORBER-CONTAINING NUCLEAR FUEL PELLETS AND FORMATION OF THE SAME

[75] Inventors: Shih-Ming Ho, Penn Hills Township, Allegheny County; Kenneth C. Radford, Irwin, both of Pa.

[73] Assignee: Westinghouse Electric Corp., Pittsburgh, Pa.

[21] Appl. No.: 678,604

[22] Filed: Dec. 5, 1984

[51] Int. Cl.⁴ .............................................. G21C 3/00
[52] U.S. Cl. .................................... 376/419; 376/414
[58] Field of Search .............. 376/414, 417, 418, 419, 376/339, 904, 905, 902

[56] References Cited

U.S. PATENT DOCUMENTS

| | | | |
|---|---|---|---|
| 3,427,222 | 2/1969 | Biancheria | 376/419 |
| 3,826,754 | 7/1974 | Grossman | 376/419 |
| 4,213,883 | 7/1980 | Owens | 376/419 |
| 4,474,728 | 10/1984 | Radford | 376/339 |

*Primary Examiner*—Donald P. Walsh
*Attorney, Agent, or Firm*—D. Satina

[57] ABSTRACT

A burnable absorber-containing glaze is formed on nuclear fuel pellets by applying a finely divided mixture of a boron-containing burnable absorber and a boron-containing glass to the pellet surface as a coating and firing the coated pellets at 900°–1100° C., for about 5 to 15 minutes, to melt the boron-containing glass and encapsulate the boron-containing burnable absorber. The coating is of a thickness of 1 mil or less and contains an amount of $B^{10}$ sufficient to provide desired absorption of neutrons during reactor operation. The resultant pellets exhibit good adhesion of the coating and excellent resistance to moisture adsorption.

26 Claims, 4 Drawing Figures

BURNABLE ABSORBER-CONTAINING NUCLEAR FUEL PELLETS AND FORMATION OF THE SAME

The present invention relates to nuclear fuel pellets containing a boron-containing burnable absorber as a glazed coating thereon and a composition and method for forming such a glazed coating.

BACKGROUND OF THE INVENTION

It is well-known that the incorporation, in various manner, of a burnable absorber with nuclear fuel pellets, which enables the use of excessive amounts of fuel in a reactor during the initial life of the fuel, can extend the life of the fuel elements. In some instances, the burnable absorber is mixed directly with the fuel and integrated therewith, while in other instances, a burnable absorber coating may be applied to the surface of fuel pellets, or discrete forms of a burnable absorber may be interspersed between conventional fuel pellets, or otherwise located within the cladding for the nuclear fuel.

In U.S. Pat. No. 3,122,509, for example, coherent nuclear fuel elements are disclosed where conventional base glass compositions are admixed with a nuclear fuel or other nuclear material, as a binder glass. Boron carbide, for example, may be blended with a base glass of conventional glass-making materials, and the blended mixture placed in a metal cladding tube and compacted. The compact is then heated to sinter the glass and boron carbide together in a coherent form. The coherent conventional glass-boron carbide cylinders formed were heated to give cylinders that showed a uniform distribution of boron carbide within the cylinders without voids. In effect, this reference discloses the use of conventional glass components for use as a binder, in the formation of an actinide oxide, or other additives, in the formation of fuel elements, or other elements, such as cylindrical fuel shapes, or formation of cylindrical burnable absorber shapes.

Since problems exist with the formation and use of fuel elements that incorporate a burnable absorber directly within the pellet or element, it has been proposed to provide the burnable absorber in the form of a coating on the pellet. As disclosed in U.S. Pat. No. 3,427,222, which is assigned to the assignee of the present invention, a sintered nuclear fuel pellet may have a coating of boron carbide, or other burnable absorber, formed thereon by fusion bonding of the burnable absorber, as a coating, on the surface of the fuel pellet. As disclosed therein, the coating may be formed by (1) plasma spraying or flame spraying of the burnable absorber with optional addition of uranium dioxide or other ceramic oxides, (2) dipping the pellets in a slurry of the burnable absorber and a ceramic binder such as zirconium silicate or sodium tetraborate and firing, (3) vapor coating the pellets, or (4) electron beam bombardment of a burnable absorber on the pellets. Coatings formed by application of a mixture of boron carbide with a binder such as zirconium silicate or by application of sodium tetraborate, however, have resultant problems. Where a coating of a mixture of boron carbide and zirconium silicate was formed, the resultant coating was not adequately stable, and peel tests, using Scotch tape, resulted in removal of the coating. If higher temperatures, in excess of 1000° C. were to be used to sinter the material to improve adhesion, the boron carbide will react with both the uranium dioxide of the pellets and possibly with the zirconium silicate resulting in loss of boron as an absorber in the finished pellet. Where a coating of sodium tetraborate was formed, while the resultant coating showed excellent bonding and passed a peel test, the coatings were not moisture resistant and hydrogen pickup was evident indicating significant moisture adsorption. In addition, the coating has a low melting point ($\leq 750°$ C.) and during normal reactor operation, it would be expected to slump and possible adhesion/reaction of the coating with the cladding will occur.

The present inventors are also aware of the earlier work disclosed in applications, "Burnable Absorber Coated Nuclear Fuel", Ser. No. 468,788, filed Feb. 22, 1983 in the names of K. C. Radford and B. H. Parks; and "Coating a Uranium Dioxide Nuclear Fuel with a Zirconium Diboride Burnable Poison", Ser. No. 468,743, also filed Feb. 22, 1983 in the name of Walston Chubb, which relate to coated nuclear fuel pellets, both of which applications are assigned to the assignee of the present invention.

It is an object of the present invention to provide a glaze coating composition for use in coating of nuclear fuel pellets with a boron-containing burnable absorber which forms a coating having a high melting point and a low propensity for moisture adsorption.

It is another object of the present invention to provide a method for forming nuclear fuel pellets having a burnable absorber combined therewith in the form of a coating of a boron-containing burnable absorber encapsulated in a specially developed boron-containing glass composition.

SUMMARY OF THE INVENTION

Nuclear fuel pellets having a burnable absorber combined therewith are formed by combining discrete particles of a boron-containing burnable absorber and a special boron-containing glass composition to form a coating mixture, applying the coating mixture to the surface of the pellets, heating the pellets having the coating mixture thereon to an elevated temperature, between 900°–1100° C., for 5 to 15 minutes, to melt the boron-containing glass and encapsulate the boron carbide particles, without enabling reaction between the boron carbide with the glass or fuel, and coating the pellets. The resultant coated pellets have a glaze coating of boron carbide particles encapsulated in a boron-containing glass and the coating exhibits excellent adhesion to the pellets and excellent resistance to moisture adsorption.

The burnable absorber-containing coating composition used to coat the fuel pellets is composed of discrete particles of 20–80 percent by weight of a boron-containing burnable absorber, such as boron carbide, and 80–20 percent by weight of a specific boron-containing glass composition. Preferably, the discrete boron carbide particles are of a size less than 10 microns in diameter and the boron-containing glass particles are of a size less than 5 microns in diameter, which enables intimate mixing thereof, and after firing, each of the boron carbide particles are coated with a thin film of glass, and encapsulated in a thin glaze coating. These fine particle sizes enable the use of a higher boron carbide content than is usable when the particle size is somewhat larger, but still less than 325 mesh.

DETAILED DESCRIPTION

Figure 2:
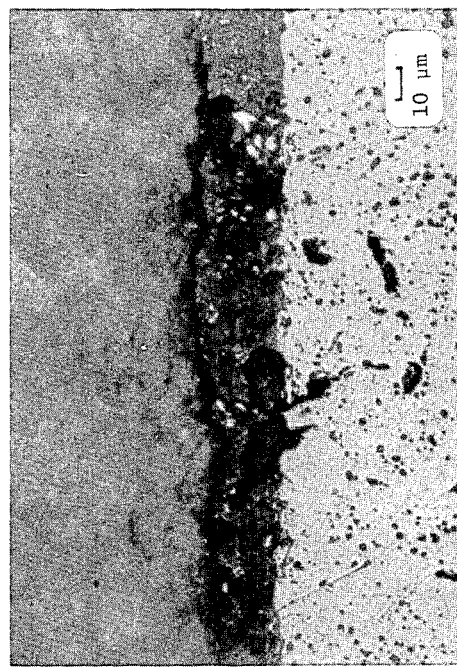
FIGS. 1 and 2 are photomicrographs at two different magnifications, showin the encapsulation of boron carbide in a boron-containing glass as an embodiment of the present invention, the coating adhered to a pellet of uranium dioxide.

According to the present invention, a composition and method are provided for combining a boron-containing burnable absorber with a nuclear fuel pellet, with the burnable absorber coated on the pellet, encased in a boron-containing glass.

The nuclear fuel pellets are preferably comprised of uranium dioxide which is enriched in U-235 isotope. Other such nuclear fuels, however, may be used in the formation of the pellets, such as a mixture of uranium-plutonium dioxide. The fuel pellets are generally formed by enriching the uranium dioxide and, either alone or in mixture with plutonium dioxide, compacting the material to the desired shape and size, and sintering the same to produce dense pellets for use in a nuclear fuel rod. The sintered pellets are then coated according to the present invention.

The coating formed on the nuclear fuel pellets is a boron-containing burnable absorber encased in a boron-containing glass, which coating is resistant to peeling and exhibits exceptionally low moisture or hydrogen adsorption.

The boron-containing burnable absorber is preferably boron carbide ($B_4C$) but other known boron-containing absorbers such as zirconium diboride ($ZrB_2$), and the like, which are stable at temperatures in excess of about 1000° C. may also be used.

The second component of the coating composition of the present invention is a specially developed boron-containing glass composition. The boron-containing glass composition has a melting temperature between 900°-1100° C. and contains boron oxide ($B_2O_3$); silicon dioxide ($SiO_2$); at least one alkali oxide such as sodium oxide ($Na_2O$); or potassium oxide ($K_2O$); at least one alkaline earth oxide such as calcium oxide (CaO) or barium oxide (BaO); and a stabilizer such as aluminum oxide ($Al_2O_3$); within specified amounts by weight of the boron-containing glass composition.

The amounts, by weight, of the various components of the glass composition that is usable are:
$B_2O_3$: 20-30 percent
$SiO_2$: 30-60 percent
$Na_2O$: 5-15 percent
BaO: 5-15 percent
CaO: 5-15 percent
$Al_2O_3$: 5-15 percent The amount of boron oxide present must be between 20-30 percent by weight. If less than about 20 percent by weight of the boron oxide is present, insufficient encapsulation and entrapment of the boron-containing burnable absorber results, while use of more than about 30 percent by weight in unacceptable due to reaction with water and, hence, moisture adsorption from the atmosphere which must be avoided. Since borosilicate glasses usually have very low thermal expansion coefficients ($\alpha$), the alkali oxide having a high $\alpha$, in excess of that of uranium dioxide, is added in order to obtain an adequate $\alpha$ of the coating to match or exceed that of the uranium dioxide fuel pellet ($\alpha = 10 \times 10^{-6}/°C.$). Since $B_4C$, which is added to the glass, has a low $\alpha(4 \times 10^{-6}/°C.)$, the boron-containing glass component should have a higher $\alpha$ such that the resulting mixture has an expansion commensurate with the amount of $B_4C$ present. Amounts of alkali metal oxide between 5-15 percent by wieght will give the desired expansion. The alkaline earth oxides are used to adjust the melting temperature of the glass composition, with a melting temperature of the glass composition, with a melting temperature of about 1000° C. being preferred. The aluminum oxide is added as a stabilizer for the glass composition.

A preferred glass composition has the composition, in percent by weight:
$B_2O_3$: 20
$SiO_2$: 40
$Na_2O$: 10
BaO: 10
CaO: 10
$Al_2O_3$: 10

This composition, when melted in a silica crucible at about 1100° C. and quenched, gives a clear glass. The glass, after being immersed in water for 24 hours and dried, showed no weight change indicating that the glass does not react with water.

In application of the present coating, the boron-containing burnable absorber and boron-containing glass are ground or otherwise provided in a finely divided particulate state, and first mixed together. Both these components should be provided in a particle size finer than 325 mesh, U.S. Standard Sieve. It is preferred, however, that the particle size of the boron carbide be smaller, with at least 90 percent of the particles being of a diameter less than about 10 microns. It is also preferred that the particle size of the boron-containing glass be smaller, with those particles being of a diameter of about 5 microns or less. These smaller particle sizes provide more intimate mixing of the particles and the ability to incorporate a higher amount of boron carbide in the coating, with the resultant coating still exhibiting exceptional bond strength and resistance to peeling and to hydrogen adsorption. In mixing of the two components, the boron carbide content of the mixture must be within a range of 20 to 80 percent by weight, while the boron-containing glass is in an amount of 80 to 20 percent by weight of the mixture. The use of less than about 20 percent by weight of boron carbide would not provide the desired absorption capabilities within a tolerable thickness of the resultant coating, while use of in excess of about 80 percent of boron carbide results in incomplete incorporation of the boron carbide in the resultant coating and possible peeling of the same from the pellets. Amounts of up to 80 percent boron carbide in the coating are achievable when the particle sizes of both components of the mixture are of a size in the above-mentioned preferred ranges. In instances where less than about 40 percent of the composition is boron carbide, particle sizes which are somewhat larger but still below 325 mesh are usable, with formation of a coating that incorporates the boron carbide sufficiently to prevent peeling or hydrogen adsorption.

The mixture of boron-containing burnable absorber and boron-containing glass may be applied to the surface of the nuclear fuel pellets by various techniques, such as dipping the pellets in a slurry of the mixture, wet spraying a slurry of the mixture on the pellets, rolling the pellets in a slurry of the mixture, or dry spraying the mixture as a powder on the surface of the pellets using electrostatic charge spraying techniques. In the dipping, wet spraying and rolling applications, the finely ground mixture of boron-containing burnable absorber and boron-containing glass is formed into a slurry with a liquid such as acetone, an alcohol, water, or a liquid hydrocarbon medium such as toluene, to the consistency desired, with a dispersant or surface active agent added to provide the desired dispersion of the particles in the liquid as a slurry.

The thickness of the boron carbide-containing coating should be kept at or below a thickness of about 1 mil. Because of the close tolerance required upon loading of fuel pellets in a metallic cladding, the application should also provide a controlled, uniform, thin coating of 1 mil or less. Also, since any coating thickness will remove some of the gap between the pellet and cladding, the coating thickness should be kept to a minimum to avoid a reduction in fuel inventory, and also to provide sufficient space for the liberation of helium, during irradiation, from the $B^{10}$ such that the desired fuel rod pressure is not exceeded. The minimum thickness of the coating will be that thickness which contains the desired amount of $B^{10}$ to provide sufficient neutron absorption during reactor operation. In general, an amount of about 1 to 2 mg, preferably 1.5 mg, of $B^{10}$ per inch of length of pellet, having a constant diameter of about 0.3 inch, has been determined to be a preferred amount. The thickness of the coating should thus be that which will provide an amount of boron, including the boron in the boron-containing burnable absorber and the boron in the boron-containing glass, that results in a $B^{10}$ quantity of about 1 to 2 mg per inch of pellet.

The coating is applied to the circumferential surface of the pellets and the ends of the pellets are uncoated. In dipping, or otherwise applying the coating where the whole pellet may be coated, the coating is removed from the ends of the pellet to leave the coating only on the circumferential surface. After coating the nuclear fuel pellets with the coating composition of the present invention, the coated pellets are dried and then heated to an elevated temperature to melt the boron-containing glass and incorporate the boron carbide particles therein. The coated pellets are heated to a temperature of between 900°–1100° C., preferably 1000°–1050° C. for a short period of time, under an atmosphere that is inert relative to the uranium dioxide of the fuel pellets and to the boron carbide powder. The temperature range of 900°–1100° C., is important in that the temperature must be high enough to melt the glass and effect encapsulation of the boron carbide, while temperatures in excess of about 1100° C. are avoided to prevent reaction between the boron of the boron-containing burnable absorber with the components of the boron-containing glass, which would, in effect, cause a loss of boron-containing absorber that is needed in the finished pellets. The melting of the glass and encapsulation of the boron-containing absorber in the glass at the above temperatures is effected by heating the coated pellets for only about 5 to 15 minutes, preferably about 10 minutes. The heating is effected in an atmosphere that is inert relative to the uranium dioxide, such as an atmosphere of hydrogen, argon, or mixtures thereof, or a vacuum, with oxygen being excluded from the atmosphere. A short holding time at the required temperature is believed to be a key factor for obtaining an ideal coated pellet.

The coated pellets, after the heating step, are cooled and the result is a nuclear fuel pellet coated with a strong, adherent coating of a boron-containing burnable absorber that is encapsulated in a boron-containing glass.

The invention is further illustrated by reference to the following example, wherein parts or percentages are by weight unless otherwise indicated.

EXAMPLE I

As an example of the coating composition and process of the present invention, a series of coated pellets were made using the following composition and procedure. A boron-containing glass composition was prepared by combining the following for 100 g of glass:

$SiO_2$–40 gr
$B_2O_3$–20 gr
$Na_2CO_3$–17 gr (10 g $Na_2O$)
$BaCO_3$–13 gr (10 g BaO)
$CaCO_3$–18 gr (10 g CaO)
$Al_2O_3$–10 gr

The above powders were mixed in a plastic bottle with $Al_2O_3$ balls on a roller overnight. The mixture was then melted in a pot furnace using a silica crucible at 1200° C. After the melt was clear, containing no bubbles, the melt was quenched into a cold stainless steel crucible which was surrounded with an ice water bath. The glass was then vibra-milled in a plastic bottle with $Al_2O_3$ balls and screened to −325 mesh.

Thirty-five (35) grams of the above glass composition, milled to a particle size, such that about 95 percent of the particles were less than 10 microns, were mixed with 65 grams of boron carbide (Tetrabor, about 96 percent of particles less than 10 microns). This mixture was formed into a slurry by combining the mixture with 67.71 grams toluene and 11.90 grams of a binder (A-20, acryloid resin sold by Rohm & Haas Co.). The coating composition resulting was sprayed onto uranium dioxide pellets, dried and the coated pellets fired in a hydrogen furnace at 1000° C. for 5 minutes.

The resultant coated pellets were subjected to a peel test wherein a piece of Scotch tape was wrapped around the circumference of the pellet, pressed firmly onto the coating, and then removed. The coated pellets passed the peel test, with no coating removed, showing good adhesion of the coating. The coated pellets had a hydrogen content of less than 1 ppm (part per million by weight) indicating resistance to moisture adsorption. The pellets showed the coating weight in thicknesses listed in Table I:

TABLE I

| Pellet No. | Original Weight of Pellet (gr) | Weight of Coated, Fired Pellet (gr) | Weight of Coating (gr) | Thickness of Coating (mil) |
|---|---|---|---|---|
| 1 | 7.4909 | 7.4992 | 0.0083 | 0.9–1.00 |
| 2 | 7.3812 | 7.3894 | 0.0082 | 0.85–0.95 |
| 3 | 7.4943 | 7.5024 | 0.0081 | 0.75–1.00 |
| 4 | 7.4808 | 7.4888 | 0.0080 | 0.90–1.00 |
| 5 | 7.3750 | 7.3829 | 0.0079 | 0.85–1.00 |

As is evident from the results listed in Table I, the thickness of the coating was one mil or less and the resulting coated pellets contained a desired amount of $B^{10}$. A theoretical amount of about 8.04 mg $B^{10}$ is desired, with the actual amounts listed being between about 7.9 mg to 8.3 mg. The actual amount of $B^{10}$ is calculated by combining the amount of $B^{10}$ in the glass and the amount of $B^{10}$ in the boron carbide (about 18.9 percent of boron being the $B^{10}$ isotope in natural boron).

EXAMPLE II

A further series of pellets were coated as follows. Powdered boron-containing glass was prepared having the following composition, by weight: $SiO_2$–40; $B_2O_3$–20; $Al_2O$–10; BaO–10; CaO–10; and $Na_2O$–10. The glass was then vibra-milled into a powder (<325 mesh) for mixing with $B_4C$ to prepare the coating slurry.

Several slurries were made by mixing the powdered boron-containing glass and $B_4C$ powders (Norton Company $B_4C$ powder, about 90 percent of particles less than 15 microns) in different proportions (20, 30, 40 and 50 percent by weight $B_4C$) using acetone as the liquid medium and a dispersing agent (a solution containing 13 volume percent of Tamol and 1 volume percent of Triton from Rohm & Haas Co.). Uranium dioxide pellets were coated with these slurries either by dipping or spraying methods. A uniform layer of coating was obtained and dried quickly. The coated uranium dioxide pellets were fired in a hydrogen furnace at 950° C. for 10–15 minutes. The glass melted and the $B_4C$ particles became immersed in the melt, but did not react with the glass.

The coating containing 30 percent by weight $B_4C$ or less showed a shiny, adherent, glassy surface which passed the peel test (aforedescribed) without any evidence of coating removal. The coating containing 40 percent by weight $B_4C$ showed a dull but still adherent coating and also passed the peel test. However, the coating containing 50 percent by weight $B_4C$ failed to peel test. This is believed to be a result of the glass particles not being in a sufficiently finely divided state to encapsulate all of the $B_4C$ particles.

The moisture content of the coated pellets was measured and showed hydrogen contents in the range of 0.3–0.7 ppm. This low hydrogen content is considered to be due to the smooth, non-porous nature of the surface resulting in less surface area of the coating and the passive nature of the boron-containing glass to moisture.

Figure 1:
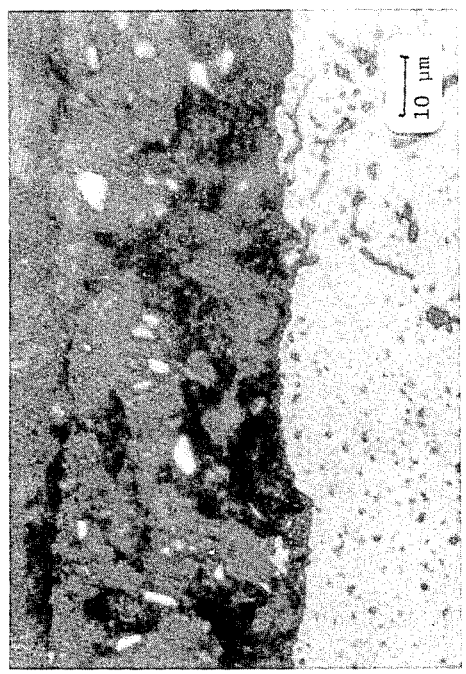

Metallographic sections, at two magnifications, of a pellet so produced are illustrated in FIGS. 1 and 2. It is clear that the coating is adherent, uniform and continuous. There are no cracks in the coating or at the pellet/coating interface. The encapsulated boron carbide particles show as white spots in the glass matrix.

EXAMPLE III

A series of pellets were coated according to the procedure of Example II, wherein the coating contained 40 percent by weight $B_4C$. Before firing of the pellets, a second coating containing only the boron-containing glass, without any added $B_4C$ was applied to the initially coated pellets, as an overcoat. The dual-coated pellets, after drying, containing a major thickness of boron carbide containing glass and a minor thickness of glass overlay, were then fired as described in Example II. The resultant dual-coated pellets had a shiny and glassy coating and passed the peel test. The moisture content of the dual-coated pellets also showed hydrogen contents in the range of 0.3–0.6 ppm.

Figure 4:
FIGS. 3 and 4 are photomicrographs at two different magnifications, showing another embodiment of the present invention where a coating of boron carbide encapsulated in a boron-containing glass has a layer of the glass formed thereover.
Figure 3:
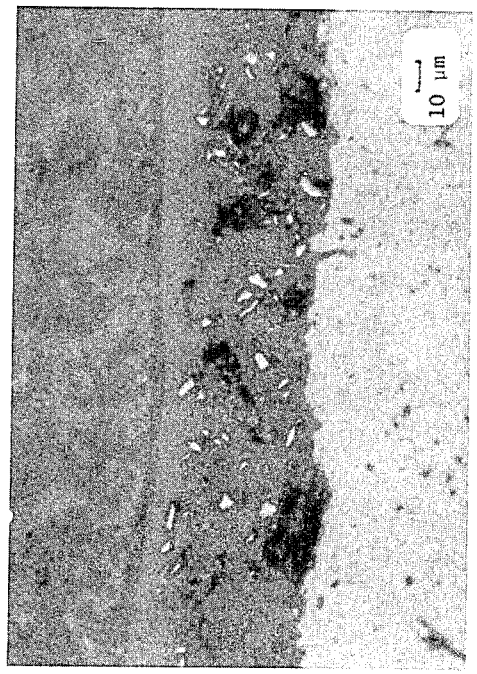

Metallographic sections of a dual-coated pellet so produced are illustrated at two magnifications, in FIGS. 3 and 4. Again, an adherent, uniform and continuous coating with no cracks either in the coating or at the pellet/coating interface are indicated. The extremely smooth surface of the top, glass layer (without any $B_4C$ particles) is also visible in FIGS. 3 and 4. It should be noted that the two coating layers merged at their interface such that no bond line is apparent between the two layers, although the bottom layer containing the boron carbide is seen as being covered by a thin glass layer free of boron carbide particles. Again, the boron carbide particles show as white spots in the glass matrix.

EXAMPLE IV

A series of coated pellets were made according to the procedure of Example I, except that the coating composition comprised 80 grams of boron carbide (Tetrabor, about 96 percent of particles less than 10 microns) and 20 grams of the glass composition, that had been ground to a particle size of less than about 5 microns in diameter. Coated pellets, after drying, were fired at about 1000° C. for 5 to 15 minutes. The thickness of the final coating was between about 0.5 to 0.7 mil. The fired pellets passed the peel test, indicating that up to 80 percent boron carbide can be present in the glazed coating when the boron carbide particles are finely divided and the glass particles are also finely divided.

The coatings prepared according to the present invention, wherein a burnable absorber is encapsulated in a boron-containing glass exhibit very low hydrogen (moisture) adsorption (<1 ppm) and have a strong bond with the pellet without any cracks in either the glass, the coating, or at the interface. The coating also provides a smooth surface which could act as a lubricant, and is provided by a process tht is relatively simple, quick, and requires less capital expediture than other processes. Both the thickness of the coating and the $B^{10}$ content in the coating can be varied and controlled to fit the exact needs of the user.

What is claimed is:

1. The method of forming nuclear fuel pellets having a burnable absorber combined therewith comprising:
    combining discrete particles of a boron-containing burnable absorber and discrete particles of a boron-containing glass composition to form a coating mixture, said boron-containing glass composition comprising 20–30 percent by weight $B_2O_3$;
    applying said coating mixture to the surface of nuclear fuel pellets;
    heating said nuclear fuel pellets having said coating mixture on the surface thereof, to an elevated temperature sufficient to melt said boron-containing glass, and incorporate said boron-containing burnable absorber in the resultant melt while preventing reaction between the burnable absorber and the boron-containing glass; and
    cooling said pellets.

2. The method as defined in claim 1 wherein said discrete particles to form said coating mixture comprise 20–80 percent by weight of said boron-containing burnable absorber and 80–20 percent by weight of said boron-containing glass composition.

3. The method as defined in claim 2 wherein said boron-containing glass composition consists essentially of 30–60 percent by weight $SiO_2$, 20–30 percent by weight $B_2O_3$, 5–15 percent by weight of an alkali oxide selected from the group consisting of $Na_2O$ and $K_2O$, 5–15 percent by weight BaO, 5–15 percent by weight CaO, and 5–15 percent by weight $Al_2O_3$.

4. The method as defined in claim 3 wherein said boron-containing burnable absorber is boron carbide.

5. The method as defined in claim 4 wherein said boron-containing glass composition consists essentially of 40 percent by weight $SiO_2$, 20 percent by weight B$_2$O$_3$, 10 percent by weight Na$_2$O, 10 percent by weight BaO, 10 percent by weight CaO, and 10 percent by weight Al$_2$O$_3$.

6. The method as defined in claim 2 wherein said discrete particles of boron-containing burnable absorber and said discrete particles of boron-containing glass are all smaller than 325 mesh.

7. The method as defined in claim 6 wherein said discrete particles of boron-containing burnable absorber are of a size such that at least 90 percent of the particles are less than 10 microns in diameter.

8. The method as defined in claim 7 wherein said discrete particles of boron-containing glass are of a size of 5 microns or less in diameter.

9. The method as defined in claim 2 wherein said nuclear fuel pellets having said coating mixture on the surface thereof are heated to a temperature of between about 900°–1100° C.

10. The method as defined in claim 9 wherein said nuclear fuel pellets having said coating mixture on the surface thereof are heated to a temperature of between about 1000°–1050° C.

11. The method as defined in claim 9 wherein said heating is in a hydrogen atmosphere.

12. The method as defined in claim 9 wherein said heating is in an argon atmosphere.

13. The method as defined in claim 1 wherein the resultant coating on the nuclear fuel pellets is of a thickness of one mil or less.

14. The method as defined in claim 13 wherein the resultant coating contains an amount of B$^{10}$ equivalent to about 1 to 2 mg per inch of pellet length.

15. The method as defined in claim 1 wherein after said applying of the coating mixture to the surface of the pellets and prior to said heating, a layer of said boron-containing glass composition is applied over said coating mixture.

16. A nuclear fuel pellet produced by the process of claim 1.

17. A nuclear fuel pellet produced by the process of claim 15.

18. A burnable absorber-containing coating composition for use in forming nuclear fuel pellets having a burnable absorber combined therewith comprising a mixture of discrete particles of:
  20–80 percent by weight of boron-containing burnable absorber; and
  80–20 percent by weight of a boron-containing glass composition containing, in percent by weight;
  30–60 percent SiO$_2$
  20–30 percent B$_2$O$_3$
  5–15 percent of an alkali oxide selected from the group consisting of Na$_2$O and K$_2$O
  5–15 percent BaO
  5–15 percent CaO
  5–15 percent Al$_2$O$_3$.

19. A burnable absorber-containing coating composition as defined in claim 18 wherein said boron-containing burnable absorber is boron carbide.

20. A burnable absorber-containing coating composition as defined in claim 19 wherein the amount of said SiO$_2$ is 40 percent, said B$_2$O$_3$ is 20 percent, said Na$_2$O is 10 percent, said BaO is 10 percent, said CaO is 10 percent, and said Al$_2$O$_3$ is 10 percent.

21. A burnable absorber-containing coating composition as defined in claim 18 wherein said discrete particles in said mixture are all below 325 mesh.

22. A burnable absorber-containing coating composition as defined in claim 21 wherein said discrete particles of boron carbide are of a size such that at least 90 percent of the particles are less than 10 microns in diameter.

23. The burnable absorber-containing coating composition as defined in claim 22 wherein said discrete particles of boron-containing glass are of a size of 5 microns or less in diameter.

24. A burnable absorber-containing coating composition for use in coating nuclear fuel pellets, said coating composition comprising a mixture of discrete particles of a boron-containing burnable absorber and discrete particles of a boron-containing glass composition, said boron-containing glass composition containing 5–15% of an alkali oxide selected from the group consisting of Na$_2$O and K$_2$O, the alkali oxide acting to increase the thermal expansion coefficient of the boron-containing glass composition to result in a burnable absorber-containing coating composition having a coefficient of thermal expansion greater than or equal to the coefficient of thermal expansion of an uncoated nuclear fuel pellet.

25. The burnable absorber-containing coating composition as defined in claim 24 wherein said boron-containing glass composition comprises, in percent by weight;
  30–60% SiO$_2$
  20–30% B$_2$O$_3$
  5–15% BaO
  5–15% CaO
  5–15% Al$_2$O$_3$ in addition to 5–15% alkali oxide selected from the group consisting of Na$_2$O and K$_2$O.

26. The burnable absorber-containing coating composition as defined in claim 25 wherein said boron-containing burnable absorber is boron carbide.

* * * * *